(12) United States Patent
Wang et al.

(10) Patent No.: US 7,416,125 B2
(45) Date of Patent: Aug. 26, 2008

(54) SYNTHESIS DECODING AND METHODS OF USE THEREOF

(75) Inventors: Ynjiun P. Wang, Cupertino, CA (US); Andrew Longacre, Jr., Skaneateles, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 72 days.

(21) Appl. No.: 11/088,612

(22) Filed: Mar. 24, 2005

(65) Prior Publication Data

US 2006/0213999 A1    Sep. 28, 2006

(51) Int. Cl.
*G02B 26/10* (2006.01)
*G06K 9/22* (2006.01)
*G06K 7/10* (2006.01)

(52) U.S. Cl. .................... 235/462.25; 235/462.01; 235/462.15

(58) Field of Classification Search .................. 235/462.01–462.49, 454
See application file for complete search history.

(56) References Cited

U.S. PATENT DOCUMENTS

| | | | |
|---|---|---|---|
| 4,567,610 A | 1/1986 | McConnell | |
| 4,685,143 A | 8/1987 | Choate | |
| 4,757,551 A | 7/1988 | Kobayashi et al. | |
| 4,805,224 A | 2/1989 | Koezuka et al. | |
| 4,879,456 A | 11/1989 | Cherry et al. | |
| 4,962,423 A | 10/1990 | Yamada et al. | |
| 5,134,272 A | 7/1992 | Tsuchiya et al. | |
| 5,182,777 A | 1/1993 | Nakayama et al. | |
| 5,227,617 A | 7/1993 | Christopher et al. | |
| 5,235,167 A | 8/1993 | Dvorkis et al. | |
| 5,276,315 A | 1/1994 | Surka | |
| 5,335,290 A | 8/1994 | Cullen et al. | |
| 5,373,147 A | 12/1994 | Noda | |
| 5,471,041 A | 11/1995 | Inoue et al. | |
| 5,475,768 A | 12/1995 | Diep et al. | |

(Continued)

FOREIGN PATENT DOCUMENTS

JP    55-115166 A    9/1980

(Continued)

OTHER PUBLICATIONS

Internet article "Bar Code 1" by Adams Communications available at the website http://www.adams1.com/pub/russadam/upccode.html and dated Dec. 15, 2001 at the Internet archival site http://www.archive.org.*

(Continued)

*Primary Examiner*—Daniel A Hess
(74) *Attorney, Agent, or Firm*—Marjama Muldoon Blasiak & Sullivan LLP

(57) ABSTRACT

Systems and methods for successfully decoding optical images of objects of interest when such objects are situated outside a conventional working range of an imaging system, or when such objects are degraded. The systems and methods are based upon a comparison of computed signals corresponding to distorted images that would be obtained from known objects, such as barcodes, when viewed outside a working range, or when degraded, with actual signals obtained from the object of interest. The computed signals in one embodiment are recorded in a lookup table. An advantage of the systems and methods disclosed is that there results a smooth, monotonic probability of correctly decoding the image of interest, even beyond the working distance. A handheld or portable apparatus useful for practicing the invention is also disclosed.

29 Claims, 10 Drawing Sheets

U.S. PATENT DOCUMENTS

| | | |
|---|---|---|
| 5,481,098 A | 1/1996 | Davis et al. |
| 5,504,319 A | 4/1996 | Li et al. |
| 5,510,603 A | 4/1996 | Hess et al. |
| 5,524,065 A | 6/1996 | Yagasaki |
| 5,550,363 A | 8/1996 | Obata |
| 5,591,952 A * | 1/1997 | Krichever et al. ...... 235/462.11 |
| 5,644,765 A | 7/1997 | Shimura et al. |
| 5,739,518 A | 4/1998 | Wang |
| 5,793,899 A | 8/1998 | Wolff et al. |
| 5,796,868 A | 8/1998 | Dutta-Choudhury |
| 5,845,007 A | 12/1998 | Ohashi et al. |
| 5,867,277 A | 2/1999 | Melen et al. |
| 5,889,270 A * | 3/1999 | van Haagen et al. ... 235/462.15 |
| 5,943,441 A | 8/1999 | Michael |
| 5,953,130 A | 9/1999 | Benedict et al. |
| 5,987,172 A | 11/1999 | Michael |
| 5,992,753 A | 11/1999 | Xu |
| 6,000,612 A | 12/1999 | Xu |
| 6,002,978 A | 12/1999 | Silver et al. |
| 6,005,978 A | 12/1999 | Garakani |
| 6,035,066 A | 3/2000 | Michael |
| 6,575,367 B1 | 6/2003 | Longacre, Jr. |
| 6,601,772 B1 | 8/2003 | Rubin et al. |
| 2001/0015378 A1 * | 8/2001 | Watanabe et al. ...... 235/462.19 |
| 2006/0113387 A1 * | 6/2006 | Baker et al. ............ 235/462.12 |

OTHER PUBLICATIONS

Jacob Rabinow, Developments in Character Recognition Machines at Rabinow Engineering Company, Optical character Recognition, 1962, Spartan Books, USA, pp. 27-50.

George S. Blasiak, PTO/SB/24, Express Abandonment Under 37 CFR 1.138, U.S. Appl. No. 11/439,893, filed May 24, 2006. Express Abandonment filed via facsimile on Sep. 13, 2006.

* cited by examiner

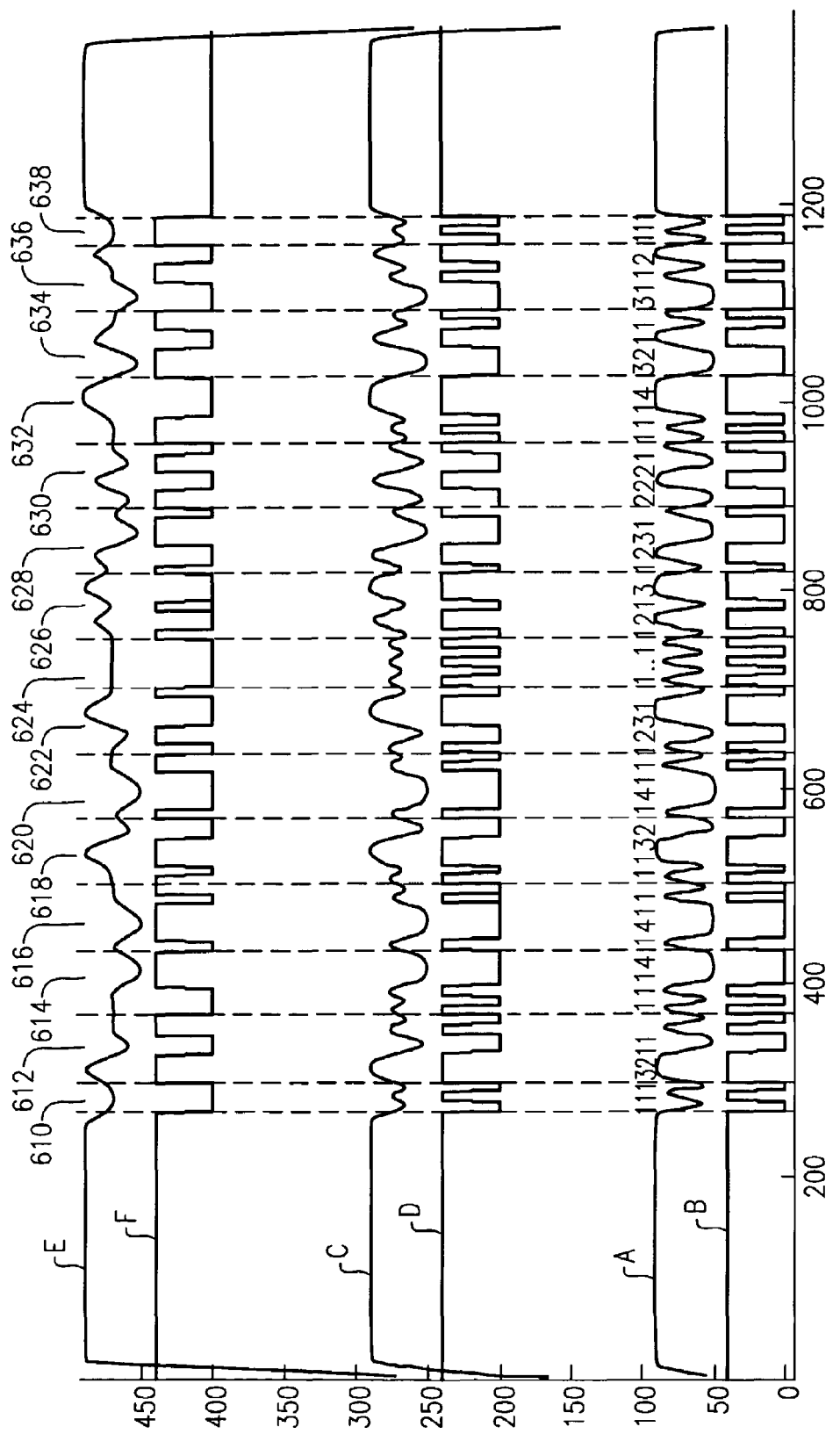

SYNTHESIS DECODING AND METHODS OF USE THEREOF

CROSS REFERENCE TO RELATED APPLICATIONS

This application is related to co-pending U.S. patent application Ser. No. 11/077,975, filed Mar. 11, 2005, entitled "Bar Code Reading Device With Global Electronic Shutter Control," and to co-pending U.S. patent application Ser. No. 10/958,779, filed Oct. 5, 2004, entitled "System And Method To Automatically Discriminate Between A Signature And A Barcode," which applications are incorporated herein by reference in their entirety.

FIELD OF THE INVENTION

The invention relates to decoding images in general and particularly to a system and method for decoding images that operates beyond a conventional depth of field of a viewing system.

BACKGROUND OF THE INVENTION

Image restoration has been proven to be a difficult problem. There are several techniques that have been proposed for the recovery of images, including images of symbols such as barcodes. Proposed methods include inverse filtering, least squares (Wiener) filtering, and iterative inverse filtering, among others. As a general rule, the use of inverse filters is not practical because they are highly susceptible to noise. Furthermore, there may be points or regions in the frequency domain such that the transform function values of those points or regions are zero or very small. The inverse function of a point having a zero value is undefined. The inverse function of a point having a very small value is assigned a very large and unrealistic value that tends to distort the reconstructed image.

Least squares methods provide solutions that are considered to be "best fits" to sets of data. However, if some of the data is corrupted, or is missing, the application of a least squares fitting method will provide a solution that is influenced by the corrupted data, or that fails to take into account the missing data. In either event, the "best fit" solution can be seriously in error as compared to an analysis of data that is complete and uncorrupted.

As indicated, a number of problems in decoding corrupted, distorted or incomplete image data representing symbols such as barcodes have been observed. There is a need for systems and methods that correctly interpret image data representing symbols that is acquired from objects that are situated beyond the extremities of the depth of field of the image acquisition system, particularly beyond the pixel resolution limitation or due to smearing caused by motion.

SUMMARY OF THE INVENTION

In one aspect, the invention relates to a bar code reading apparatus for decoding a degraded encoded symbol character. The bar code reader comprises a detector that detects light intensity corresponding to illumination reflected from the degraded encoded symbol character and that generates an electrical signal from the detected light intensity, the degraded encoded symbol character failing to represent a valid encoded symbol character of a symbology lacking error correction coding at an encoded symbol character level; and a signal processor that recovers from the generated electrical signal a value representative of a valid encoded symbol character of the symbology.

In one embodiment, the signal processor comprises a microprocessor, a memory, and instructions recorded on a machine-readable medium for controlling the operation of the microprocessor. In one embodiment, the valid encoded symbol character corresponds to a value represented by the degraded encoded symbol character at a time prior to it being degraded. In one embodiment, the detector comprises an imager device having a plurality of pixel elements. In one embodiment, the detector comprises a laser scanner apparatus. In one embodiment, the bar code reading apparatus is of a format compact enough to be operated while being supported by a hand of a user. In one embodiment, the symbology is a Universal Product Code ("UPC") symbology. In one embodiment, the signal processor compares the generated electrical signal to a pre-defined signal. In one embodiment, the bar code reading apparatus further comprises an analog-to-digital converter for digitizing the generated electrical signal.

In another aspect, the invention relates to a hand held bar code reading apparatus for decoding a degraded encoded symbol character. The hand held bar code reader comprises a trigger mechanism configured to receive a trigger signal and to generate an initiation signal; a detector that, responsive to the initiation signal, automatically detects light intensity corresponding to illumination reflected from the degraded encoded symbol character and that generates an electrical signal from the detected light intensity, the degraded encoded symbol character failing to represent a valid encoded symbol character of a symbology lacking error correction coding at an encoded symbol character level; and a signal processor that, responsive to the initiation signal, automatically recovers from the generated electrical signal a value representative of a valid encoded symbol character of the symbology.

In one embodiment, the signal processor comprises a microprocessor, a memory, and instructions recorded on a machine-readable medium for controlling the operation of the microprocessor. In one embodiment, the trigger signal is generated by a selected one of an operation of the trigger mechanism by a user, a sensing by a detector of the presence of an object of interest within a field of view of the reader, and a receipt of a command from a device spaced apart from the reader.

In one aspect, the invention relates to an optical reader for reading an image. The optical reader comprises an optical sensor for receiving light corresponding to an image of interest, and for providing an electrical signal encoding information representative of at least a portion of the image of interest; an optical lens system in optical communication with the optical sensor, the optical lens system having a minimum working distance corresponding to a shortest distance between the optical sensor and the image of interest at which distance the image is at the convolution limited depth of field (clDOF) at the optical sensor, the optical lens system having a maximum working distance corresponding to a longest distance between the optical sensor and the image of interest at which distance the image is at the pixel limited depth of field (plDOF) at the optical sensor; and a memory containing a representation of an electrical signal encoding information representative of at least a portion of the image of interest, the representation of the electrical signal calculated to be produced by the optical sensor when the image of interest is situated at a distance selected from one of a distance shorter than the minimum working distance and a distance longer than the maximum working distance. When the optical sensor operates at a selected one of a distance shorter than the minimum working distance and a distance longer than the maximum working distance, the optical reader successfully decodes the information encoded in the electrical signal by comparing the corresponding representation of an electrical signal contained in the memory with the electrical signal provided from the optical sensor.

In some embodiments, the optical reader further comprises a computation module in communication with the memory and the optical sensor, the computation module configured to perform the comparison of the representation of an electrical signal contained in the memory with the electrical signal provided from the optical sensor.

In some embodiments, the optical reader further comprises a computation module in communication with the memory and the optical sensor, the computation module configured to generate the representation of the electrical signal calculated to be produced by the optical sensor when the image of interest is situated at a distance selected from one of a distance shorter than the minimum working distance and a distance longer than the maximum working distance.

In some embodiments, the optical reader further comprises a computation module in communication with the memory and the optical sensor, the computation module configured to recover a representation from a lookup table of pre-calculated ones of the representation of the electrical signal calculated to be produced by the optical sensor when the image of interest is situated at a distance selected from one of a distance shorter than the minimum working distance and a distance longer than the maximum working distance.

In another aspect, the invention features a method of decoding an image of an object. The object is situated from an optical reader at a distance selected from one of a distance shorter than the minimum working distance and a distance longer than the maximum working distance of the optical reader. The method comprises providing an optical reader for reading an image, providing a representation of an electrical signal encoding information representative of at least a portion of the image of interest, the representation of the electrical signal calculated to be produced by the optical sensor when the image of interest is situated at a distance selected from one of a distance shorter than the minimum working distance and a distance longer than the maximum working distance; obtaining image data in the form of an electrical signal from the image of the object situated from the optical reader at a distance selected to be a corresponding one of a distance shorter than the minimum working distance and a distance longer than the maximum working distance of the optical reader, the electrical signal encoding information to be decoded; and comparing the obtained image data in the form of an electrical signal with the calculated electrical signal. The optical reader successfully decodes the information encoded in the electrical signal. The optical reader comprises an optical sensor for receiving light corresponding to an image of interest, and for providing an electrical signal encoding information representative of at least a portion of the image of interest; and an optical lens system in optical communication with the optical sensor, the optical lens system having a minimum working distance corresponding to a shortest distance between the optical sensor and the image of interest at which distance the image is at the convolution limited depth of field (clDOF) at the optical sensor, the optical lens system having a maximum working distance corresponding to a longest distance between the optical sensor and the image of interest at which distance the image is at the pixel limited depth of field (plDOF) at the optical sensor.

In one embodiment, the step of comparing step is performed by a computation module. In one embodiment, the step of providing a representation of an electrical signal is performed by a computation module. In one embodiment, the step of providing a representation of an electrical signal further comprises storing the representation in a memory. In one embodiment, the step of providing a representation of an electrical signal further comprises recovering a representation from a lookup table of pre-calculated ones of the representation of the electrical signal calculated to be produced by the optical sensor when the image of interest is situated at a distance selected from one of a distance shorter than the minimum working distance and a distance longer than the maximum working distance.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 6 is a diagram that illustrates various signals, including actual recorded signals detected from a bar code, and signals obtained by subjecting the recorded signals to signal processing methods, according to principles of the invention.

DETAILED DESCRIPTION OF THE INVENTION

Figure 1A:
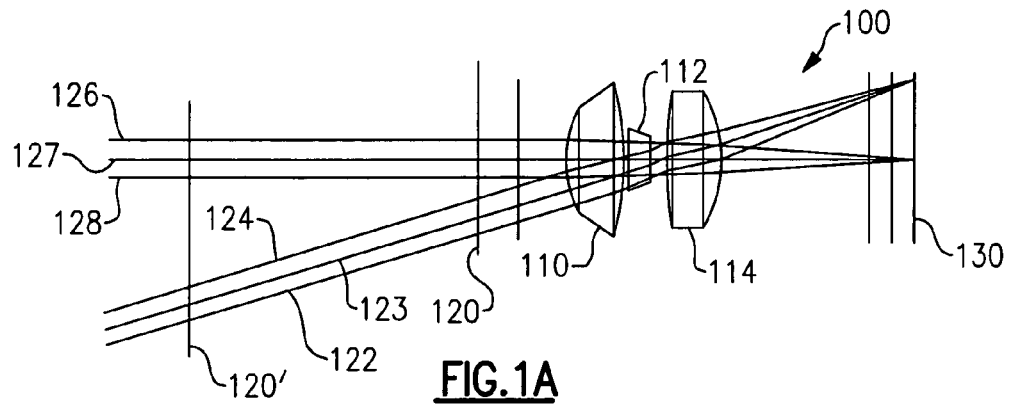
FIG. 1A is a schematic diagram showing in cross section an illustrative embodiment of an imager or camera system, according to principles of the invention.

The present invention provides systems and methods for decoding optical indicia, such as barcodes, which are physically situated beyond the designed limits of the depth of field of a reader or imager, or which are degraded with respect to valid optical indicia. As will be explained in greater detail below, an imager or reader that is used to "read" an indicium such as a barcode at a position farther away than the designed distant depth of field limit, or which has been degraded, will obtain a distorted signal. In similar manner, a reader that is used to "read" an indicium at too close a distance, or at a distance less than the designed near depth of field limit, will observe a truncated signal (e.g., will see only a portion of the indicium at one time, much as if one viewed a scene through a keyhole). In either circumstance, using conventional decoding systems and methods, the reader will in most situations fail to provide a suitable decoded signal, and often will simply report that the indicium is invalid or uninterpretable. As taught hereinbelow, the systems and methods of the invention provide suitable decoding under conditions wherein the indicium to be read is situated beyond the designed limits of the depth of field of the reader, or in instances in which an indicium is, or has become, degraded. This is accomplished by generating by computation and making available one or more lookup tables that represent the expected distorted image of, for example, the alphanumeric digits encoded in the indicium, and comparing the computed distorted image to the image "seen" by the reader or imager. In some embodiments, it is also possible to generate elements for a look up table in a phenomenological manner, that is, by taking the time to deliberately set up "reads" of known indicia at known distances, and recording the signals so produced, as a way of building the lookup table. As may be expected, the phenomenological approach is likely to be time consuming and tedious, but in principle should also provide a way of setting up such a system and method.

In contemplating the systems and methods of the invention, it is useful to recognize that the universe of possible symbols to be decoded in any given barcode symbology, or in any given set of optical indicia generally, is a limited, finite set. For example, written language uses a finite number of letters or symbols as the basic building blocks from which a message is generated. Thus, a finite set of basic building blocks can be used to generate an infinite number of messages in a language, but can be used to generate only a finite number of indicia if a finite number of such basic building blocks can be used in any one indicium, according to a protocol. By way of example, in English, even if one includes punctuation marks, the vast majority of written communications can be represented by a finite number of alphanumeric symbols, and some punctuation. In automated systems, such as computer systems, the symbols known as ASCII are sufficient to communicate the vast majority of messages written in English. The fact that the individual letters, number, and the like that will make up a message are all defined beforehand makes the problem of decoding the message solvable, even if the signals representing the message are somewhat distorted. If, in addition, it is known in advance that a specified number of letters and numbers are expected to be present in any one "message" or "symbol," the decoding problem is amenable to solution.

In a barcode image, some a priori knowledge is available of what the particular barcode is expected to look like, and hence how it is expected to appear in coded form. For example, an un-degraded image of a barcode comprises one or more bars and spaces (i.e., is represented by a step function, or in some embodiments, is a function representable as a gray scale). When imaged with an imaging engine or a barcode reader, the barcode is represented as a codeword having a sequence of binary, or in some cases, gray scale, values. In principle, the decode table which defines the exact step function (or gray scale value) of each undistorted codeword is available. The systems and methods of the invention make use of the properties of known, original images of undistorted barcodes to discern the features of images that are perceived as distorted images, which distorted images arise because the object being imaged lies outside the designed depth of field of the imaging device.

"Encoded symbol character" is intended to denote a representation of a unit of information in a message, such as the representation in a bar code symbology of a single alphanumeric character. One or more encoded symbol characters can be used to convey information, such as the identification of the source and the model of a product, for example in a UPC bar code that comprises 12 encoded symbol characters representing numerical digits. Also, an encoded symbol character may be a non-alphanumeric character that has an agreed upon conventional meaning, such as the elements comprising bars and spaces that are used to denote the start, the end, and the center of a UPC bar code. The bars and spaces used to encode a character as an encoded symbol are referred to generally as "elements." For example an encoded character in a UPC symbol consists of 4 elements, 2 bars and 2 spaces. Similarly, encoded symbol characters can be defined for other bar code symbologies, such as other one-dimensional ("1-D") bar code systems, and for two-dimensional ("2-D") bar code systems (for example, PDF417 or Aztec).

"Degraded encoded symbol character" is intended to denote an encoded symbol character that has been modified, whether deliberately or by happenstance, so that the degraded encoded symbol character is no longer in conformance with accepted standards for that type of encoded symbol character, no matter what orientation is used for viewing or scanning the encoded symbol character. Degradation may occur as a result of many causes, such as a printing defect, through subsequent environmental effects, or by deliberate acts, such defacing a symbol. Printing defects include, but are not limited to, use of a printing apparatus or method having inadequate resolution, low toner/ink levels or use of colored ink or toner causing insufficient contrast between the character and the background, and the presence of 'satellite' or 'throw-off' toner or ink contaminating the signal represented by the character. Examples of subsequent environmental effects include, but are not limited to, damage to the toner or ink forming the character, such as smearing, streaking, lift-off, bleeding (i.e. water damage), or abrasion; damage to the substrate on which the character was printed; damage to or occlusion of any layer intentionally covering the character, such as a protective transparent film or layer; or the presence of foreign material (dust, soot, dirt, etc.) which has become interposed between the character and the apparatus used to read the character.

By way of example, encoded symbol characters of the UPC bar code are represented by sequences of 4 alternating bars and spaces (or spaces and bars) having a total width of 7 width units. The bars are generally black rectangular marks having low reflectivity. The spaces are generally regions free of ink such that a white or light color of a substrate is visible, and are generally highly reflective by comparison to bars. A modified UPC encoded symbol character could in one example be any of an encoded symbol character in which ink or other dark material is applied so that one or more bars are expanded in width over their entire length, for example by covering a white space intervening between two black bars with black ink, so that a bar-space-bar sequence is converted into a single wide bar. Conversely, the application of a white (or highly reflective) substance over some width of a bar (and over its entire length) can create a situation where the width of a space is increased and the width of an adjacent bar is decreased (in the extreme converting a space-bar-space sequence into a single wider space), or a wide bar is made to appear as a thinner bar followed by a space followed by another bar, such that the total width of the original bar is used to represent not one bar, but two bars separated by a space. As will be understood from the above description, the degraded encoded symbol character can include more that 4 bars and spaces, or fewer than 4 bars and spaces, so that it no longer is in conformity with the standard definition of any of the digits 0 through 9 as used in the UPC bar code symbology. Other examples for other 1-D and for 2-D symbologies can be contemplated, wherein a given encoded symbol character is modified so that it no longer conforms to any defined symbol element in the symbology being considered. In other embodiments, a narrow bar element (having nominally zero reflectance) and a narrow space element (having nominally maximum reflectance denoted by one full unit) can be blurred to form a "gray" bar having reflectance of an intermediate value due to either motion smear or running out of pixel resolution when a barcode situated beyond far end of depth of field (plDOF). In many instances, such reflectance can be measured using a gray scale in which the units of reflectance are defined by a multi-bit digital scale (e.g., an 8-bit scale having 255 gray levels of reflectance above black at zero reflectance, or a 2-bit, 3-bit (octal), 16-bit, 24-bit or other multi-bit scale). In some embodiments, the gray scale can be used to represent color, patterns, or other visually or optically recognizable features.

In this discussion, first the system point spread function (PSF) is explained. Then, a novel approach, referred to herein as Synthesis Decoding, is described. In its simplest form, the Synthesis Decoding system and method deals with recovering data from a degraded bar code image. The Synthesis Decoder synthesizes the expected "degraded" codeword waveform from a simulated image, using the knowledge of the system PSF and a codeword decode table corresponding to a pristine barcode image. Then, by Logan's Theorem, a synthesized codeword waveform can be reduced to a sequence of zero-crossing (edge) positions or a sequence of element widths without incurring loss of information. Therefore a Synthesis Decode Table can be constructed using this sequence of element widths, which table contains all of the information present in the image.

In one embodiment, the decode process of a Synthesis Decoder then proceeds in a manner similar to the process used by a conventional decoder that performs a T-sequence comparison, using lookup in a previously constructed Synthesis Decode Table. The term "T-sequence" refers to a sequence of time durations, or equivalently, bar and space widths, that represent transitions from a first state (such as a black or a non-reflective medium) to a second state (such as gray or white, or an at least partially reflective, medium) and back to the first state. Even when edges are lost in a codeword due to subpixel sampling, certain codeword "structural" information may still be preserved. A Synthesis Decoder can still match the valid codeword structure by matching its corresponding synthesized codeword T-sequence.

Logan's theorem can be expressed as follows:
Given a band-limited Gaussian signal f(x), and letting $f_b(x)$ be the result of applying a band-pass filter to f(x), then $f_b(x)$ can be determined, to within a multiplicative constant, by the positions of its zero-crossings alone.

According to Logan's theorem, a zero-crossing operator incurs no loss of information when it transforms a band-limited Gaussian signal f(x) into a sequence of edge positions or element widths. One can reconstruct the waveform f(x) by edge position information alone, to within a multiplicative constant. This is equivalent to the observation that the N roots of an N-dimensional bounded equation define the equation to within a multiplicative constant. This theorem provides an important foundation for the Synthesis Decoder system and method. The theorem indicates that by properly extracting the edge positions of a waveform, a waveform can be reduced to a sequence of element widths without incurring a loss of information.

DESCRIPTION OF AN EXEMPLARY IMAGER

Referring to FIG. 1A, an illustrative imager or camera system 100 is shown in schematic cross section, such as the model 4000SR imaging engine available from Hand Held Products, Inc. ("HHP"), 700 Visions Drive, Skaneateles Falls, N.Y. In one embodiment, an imager according to the invention is employed in a handheld reader or a portable reader having a trigger mechanism that can be actuated by a user. Upon activation of the trigger by a user, the portable, handheld reader captures an image and processes the image using the systems and methods described herein. The imager or camera system 100 is an optical reader for reading an image. The optical reader has an optical sensor for receiving light corresponding to an image of interest, and for providing an electrical signal encoding information representative of at least a portion of the image of interest. In some embodiments, the optical sensor is a 1-D sensor, a 2-D sensor, a sensor operating as an optical array of individual pixel sensors, such as CMOS or CCD sensors. The imager or camera system 100 has an optical lens system in optical communication with the optical sensor. The imager or camera system 100 comprises one or more lenses 110, 112, 114, and causes an image of an object positioned at a plane 120 or 120' to be imaged to a focus at a plane 130. The rays 126, 127 and 128 on the axis of the imager and the rays 122, 123, and 124 off the imager axis are rays useful to show the field of view of the imager.

The optical lens system has a minimum working distance corresponding to a shortest distance between the optical sensor and the image of interest at which distance the image is at the convolution limited depth of field (clDOF) at the limit of field of view (FOV) of the optical sensor. The optical lens system has a maximum working distance corresponding to a longest distance between the optical sensor and the image of interest at which distance the image is at the pixel limited depth of field (plDOF) or convolution limited at the far end for the optical sensor. The imager or camera system 100 has a memory (or a machine-readable storage medium), and control circuitry. The memory can contain a representation of an electrical signal encoding information representative of at least a portion of the image of interest, for example in a lookup table. The representation of the electrical signal is calculated to be that signal that is produced by the optical sensor when the image of interest is situated at a distance selected from one of a distance shorter than the minimum working distance and a distance longer than the maximum working distance. When the optical sensor operates at a selected one of a distance shorter than the minimum working distance and a distance longer than the maximum working distance, the optical reader successfully decodes the information encoded in the electrical signal by comparing the corresponding representation of an electrical signal contained in the memory with the electrical signal provided from the optical sensor.

Figure 1B:
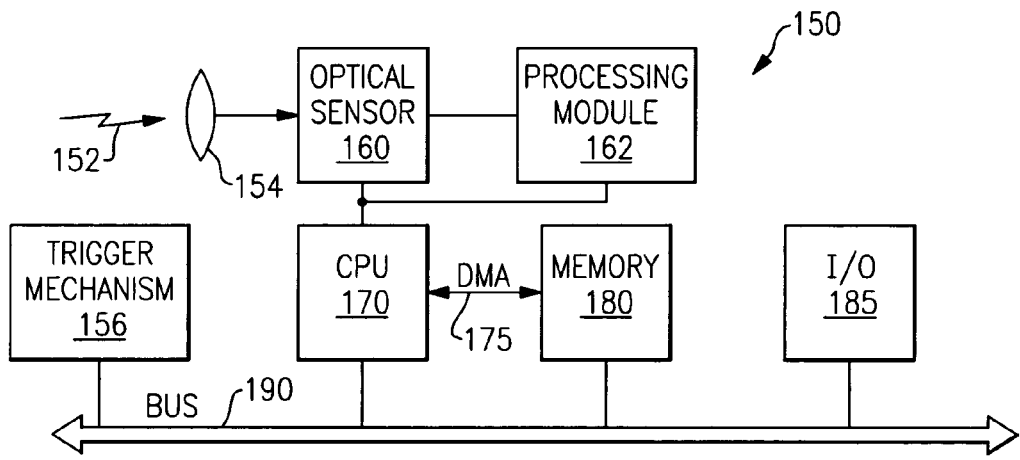
FIG. 1B is a schematic block diagram showing the electronic components of an illustrative embodiment of an imager or camera system and their interrelationships, according to principles of the invention.

FIG. 1B is a schematic block diagram 150 showing the electronic components of an illustrative embodiment of an imager or camera system (e.g., an optical reader or imager) 100 and their interrelationships. In FIG. 1B, incoming illumination from a target of interest is indicated by arrow 152, and a lens system 154, corresponding to one or more of lenses 110, 112, and 114 for FIG. 1A, receives the incoming illumination 152. The lens system 154 causes at least some of the illumination 152 to be focused at or near a plane of focus where there is situated an optical sensor 160. The optical sensor 160 converts the illumination into electrical signals. A processing module 162 is provided as necessary to condition the electrical signals, perform analog-to-digital conversion, provide timing for functions such as acquiring image information at the sensor, and extracting such information as electrical signals, and other control features that may be needed for the proper operation of the optical sensor 160. As will be understood, depending on the fabrication technology used to manufacture the optical sensor 160, some or all of the functions and capabilities of the processing module may be integrated in a single semiconductor substrate with the optical sensor 160 itself. CMOS technology is one fabrication technology that offers the possibility of such integration. The construction and operation of optical readers is well known in the optical reader arts and is not described in detail herein. Optical readers using one-dimensional pixel arrays, two-dimensional pixel arrays, and laser scanning mechanisms are all known.

Optical reader 100 has a trigger mechanism 156 in electrical communication with the electronic components of the reader 100. For example, trigger mechanism 156 is shown in electrical communication with a bus 190 in FIG. 1B, whereby, upon activation of trigger mechanism 156, signals from trigger mechanism 156 can be communicated to the components of reader 100 that are connected to bus 190. In some alternative embodiments, the trigger mechanism 156 can be connected directly to a particular electronic component of optical reader 100, for example to CPU 170, for example by way of a hard-wired interrupt. In some embodiments, the trigger mechanism 156 is configured to be activated by any of several methods, including: the activation of the trigger mechanism 156 by a user, for example by manual depression of a button; the sensing by way of a detector of the presence of an object of interest within a field of view of the reader; and a receipt of a command from a spaced apart device, for example from a controller situated outside the handheld, or portable, reader.

In some embodiments, the optical reader 100 has a computation module (e.g., CPU 170) in communication with a memory 180 and the optical sensor 160. The computation module 170 in some embodiments is in communication with the processing module 162. In some embodiments, some of the capabilities of the computation module 170 and of the processing module 162 are integrated in a single semiconductor chip. The computation module 170 is configured to perform the comparison of the representation of an electrical signal contained in the memory 180 with the electrical signal provided from the optical sensor 160. In some embodiments, the computation module 170 is configured to generate the representation of the electrical signal calculated to be produced by the optical sensor when the image of interest is situated at a distance selected from one of a distance shorter than the minimum working distance and a distance longer than the maximum working distance. In some embodiments, the computation module 170 recovers a representation from a lookup table of pre-calculated ones of the representation of the electrical signal calculated to be produced by the optical sensor when the image of interest is situated at a distance selected from one of a distance shorter than the minimum working distance and a distance longer than the maximum working distance.

The computation module 170 and the memory 180 can be in communication by way of a DMA channel 175. In addition, or alternatively, the computation module 170 and the memory 180 can be connected by way of a bus 190, such as is found in conventional computer systems. Additional circuitry that provides functionality such as input/output ("I/O") 185 can be connected to the bus 190 to provide the ability to send information (including commands and data) to the optical reader 100 from external sources, and to allow the optical reader 100 to communicate information to a user and/or to an external device or system, such as dealing with goods or services processed in a retail sales system, or for tracking the location and status of packages in a delivery system.

Figure 1C:
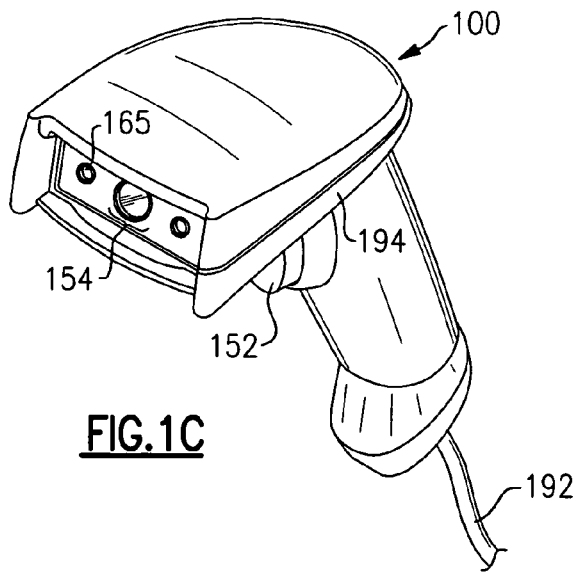
FIG. 1C is a perspective drawing of one embodiment of a hand-held image reader constructed according to principles of the invention.

FIG. 1C is a perspective drawing of one embodiment of a hand-held image reader 100 constructed in accordance with the principles of the invention. The hand-held image reader 100 includes a housing 194, a plurality of light sources 165, a lens system 154, a trigger mechanism 152 which in the illustration is a manually activated trigger button, and an interface cable 192, which cable 192 permits the reader 100 to communicate with other components, such as a central data processing and data storage system. In some embodiments, the hand held image reader 100 is portable, and a communication interface that does not require a wired connection (for example, a wireless communication system employing radio waves operating according to the IEEE 802.11 communication protocol, Bluetooth, infrared signals, or other wireless communication media) is used in place of interface cable 192. In various embodiments, the functionality of the image reader 100 can be provided by any one-dimensional or two-dimensional image readers, such as those available from Hand Held Products, Inc. and constructed in accordance with the invention. All of the components described in connection with FIG. 1A and FIG. 1B, including one or more lenses 110, 112, 114, trigger mechanism 154, optical sensor 160, processing module 162, CPU 170, DMA 175, memory 180, I/O 185 and bus 190, can be incorporated into, and can be supported by hand held housing 194. Lens system 154 can comprise glass and/or polycarbonate. Lens system 154 can be a lens singlet or else comprise a plurality of lens components; that is, lens system 154 can be a lens doublet or lens triplet, for example, one or more lenses 110, 112, 114 as shown in FIG. 1A.

Figure 2A:
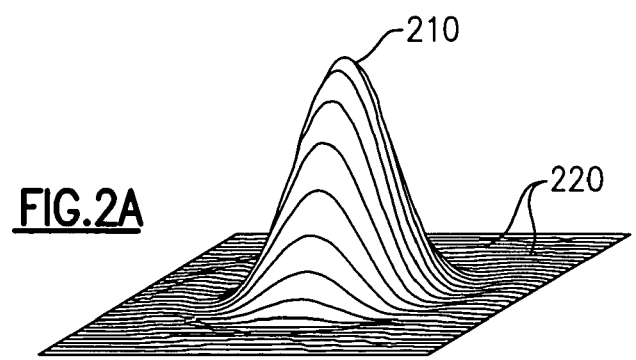
FIG. 2A is a drawing that illustrates an exemplary contour of the point spread function of an imager such as that of FIG. 1.
Figure 2B:
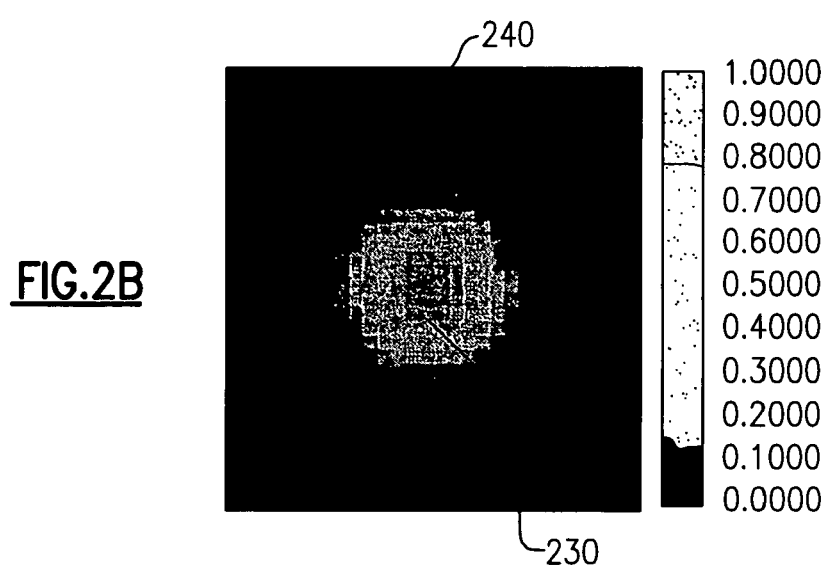
FIG. 2B is a drawing that illustrates an exemplary pixel-lated two-dimensional plot of the point spread function of an imager such as that of FIG. 1.

The imager or camera system 100 can be modeled by a point spread function as shown in FIG. 2A and FIG. 2B. Turning to FIGS. 2A and 2B, for simplicity, we focus on the center of the PSF and ignore the astigmatism on the boundary of the image plane. The contour of the PSF as shown in FIG. 2A is a bell shaped function 210 with diffraction rings 220 that is known as an Airy pattern. FIG. 2B is a diagram 230 of an Airy pattern expressed in a two dimensional pixellated display 240, in which color or intensity is used to represent amplitude. The pattern shown in FIG. 2B has edge effects that are referred to as "aliasing," because the pixel size (and/or the minimum difference in rendition, such as intensity or color change) is too large for the detail that the image is expected to contain. "Aliasing" is a well known phenomenon that occurs in visualizations using discrete systems. If the aperture of the imager is a circular aperture, then the PSF can be approximated using a first-order Bessel function $$h(r) = I_0 \left[ \frac{2J_1(\pi r)}{\pi r} \right]^2.$$

It is possible to find a Gaussian function g(x,y) to approximate this PSF as closely as one wishes by minimizing the mean square error over the area of interest. In one embodiment, a Gaussian function g(x,y) is used as an approximation of the system PSF to simplify the decode algorithm development.

Figure 2C:
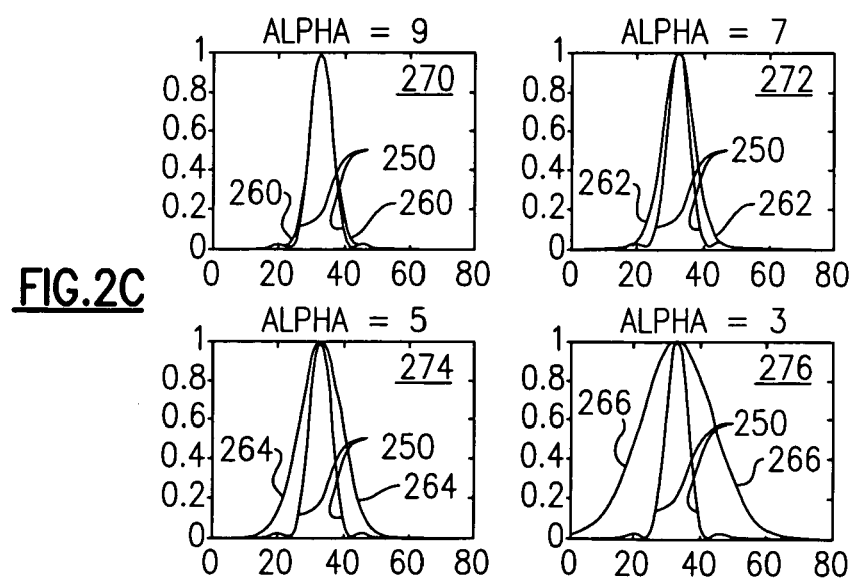
FIG. 2C is a diagram showing four illustrative comparisons of a point spread function of an imaging engine as compared to the approximate Gaussian point spread function showing a dependence on the value of a (alpha), according to principles of the invention.

As shown in FIG. 2C, which is a diagram having four panels 270, 272, 274, 276, a point spread function of an imaging engine, such as the 4000SR, that is in focus at the center of the image plane is shown as curve 250 in each panel, and the approximate Gaussian PSFs are shown as curves 260, 262, 264, 266 with different α (alpha) values (e.g., 9, 7, 5, and 3, respectively), where alpha is a reciprocal of σ (sigma) of a Gaussian function. When alpha=9.8, the Gaussian PSF and the 4000SR imaging engine PSF 250 are nearly the same. Different values of alpha can be used to simulate the through focus PSFs of various imaging engines.

Figure 3:
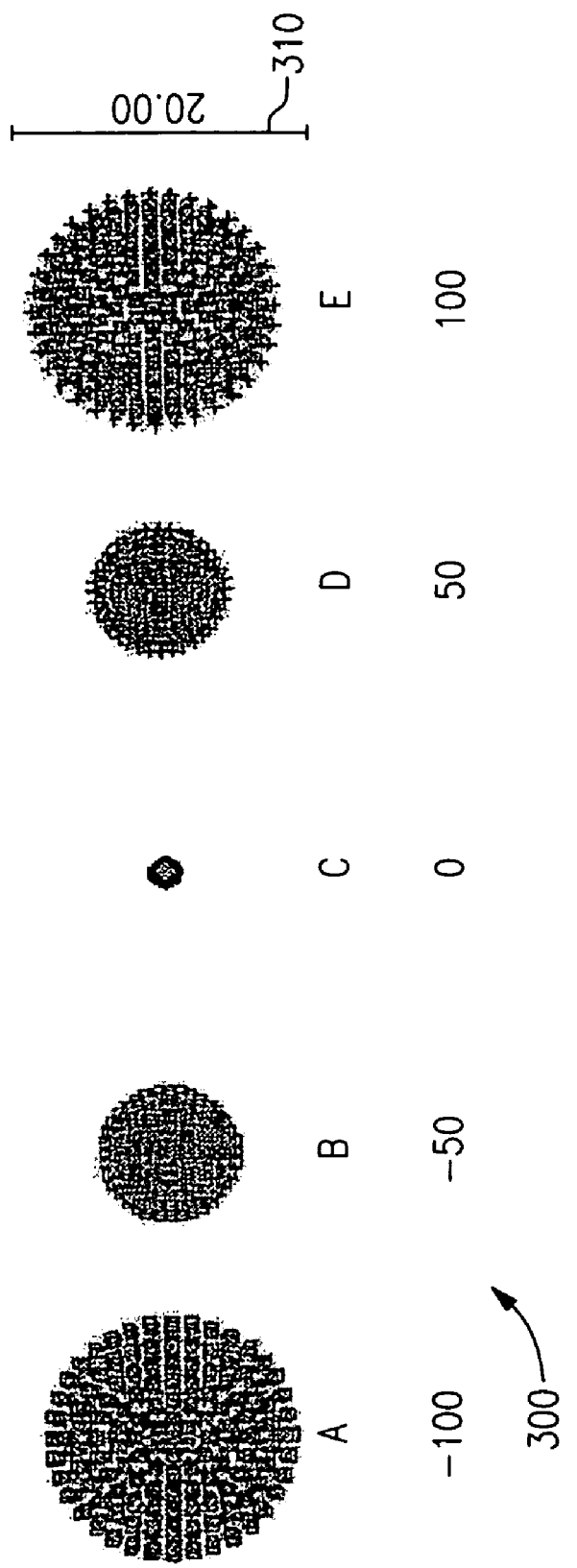
FIG. 3 is a diagram that shows several through focus (on-axis) spot diagrams of an imaging engine, at locations that are in front of, at, and behind the focal plane, according to principles of the invention.

FIG. 3 is a diagram 300 that shows the through focus (on-axis) spot diagrams A through E of the 4000SR imaging engine, at locations that are 100 microns in front of, 50 microns in front of, at, 50 microns behind, and 100 microns behind the focal plane, respectively, using a lens with a 5.9 mm effective focal length (EFL) and F/6.3. The units of the spot size are given in microns, and a scale 310 representing a dimension of 20 microns is provided at the right of FIG. 3.

Synthesis Decoder

A conventional barcode decoder tries to recover (or restore) the bar and space sequence of a barcode from an image of the barcode, including a degraded image. A classifier is used to decode the bar/space sequence. In many embodiments, the classifier is a Euclidian Distance classifier using the bar/space sequence or T-sequence as the coordinate in the codeword space. One limitation of a T-sequence decoder is the lack, in general, of an "inverse" filter for restoring the degraded image back to the original image. This limitation can be caused simply by a loss of information as a result of the band-limited nature of the imaging system. Another limitation is the inability of a conventional decoder to decode a codeword that is missing bar/space elements, which missing elements can be caused by a lack of resolution when sampling at the boundary or below the Nyquist frequency.

The invention can be described and explained with respect to any of a number of well known bar code symbologies. In one embodiment, the Universal Product Code (or "UPC") symbology will be used as an example. UPC is a well known and widely used one-dimensional bar code symbology.

Figure 4:
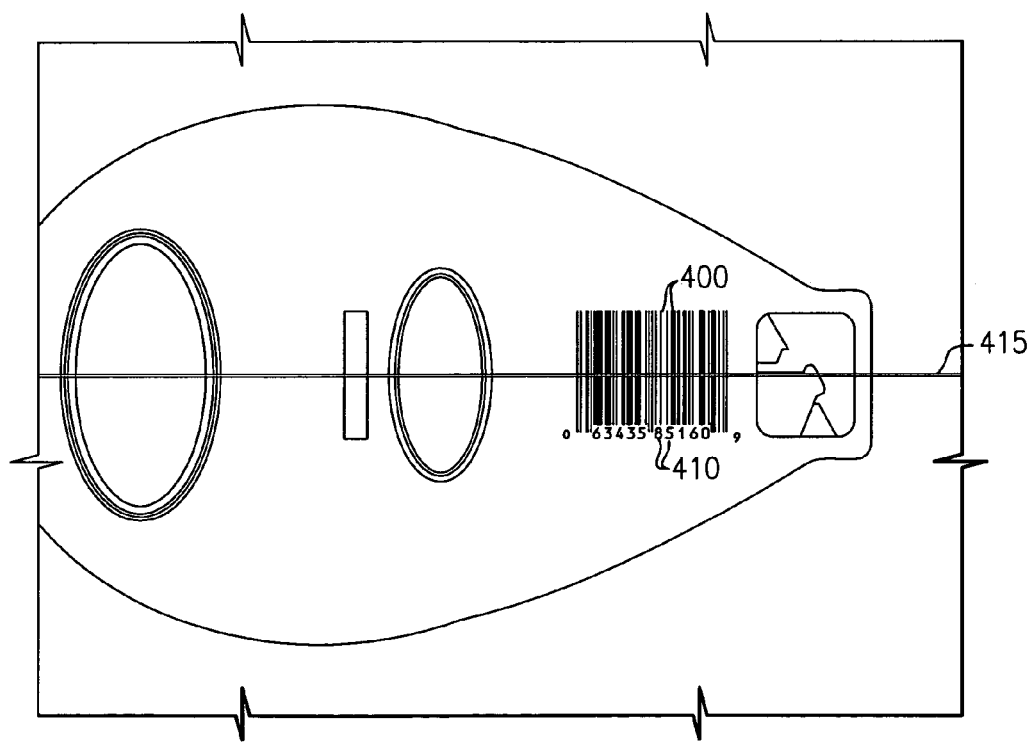
FIG. 4 is an illustration of a UPC code 400 on a commercial product.

In the symbology represented by the UPC code, which is commonly used on products available for same in retail outlets such as supermarkets and convenience stores, a sequence of decimal digits (i.e., the digits "0" through "9") is encoded as a series of dark, poorly reflective, or black, rectangular bars and a series of light, highly reflective, or white rectangular spaces. The UPC code has historically been a sequence of 12 digits, which is being augmented in the future to contain 13 digits. An example of a UPC code 400 on a commercial product is shown in FIG. 4. Below the Bars and spaces representing the UPC code are the decimal digits 410 that are encoded. In the present discussion, the UPC bar code will be described as viewed by a human with the numerical digits appearing at the bottom of the UPC bar code. In FIG. 4 a scan line 415 passing across the UPC code 400 is shown. Because the symbology is a linear (or one-dimensional) bar code symbology, it can in principle be "read" or "scanned" in a "right-side-up" or in an "upside-down" orientation. Equivalently, one can understand this "reading" or "scanning" to be performed in a "right-to-left" or "left-to-right" manner. In order to encode (and to decode) the digits in the UPC bar code symbol unambiguously, the UPC code comprises A-set characters that are used for the "left" side of a UPC bar code symbol, and C-set characters that are used for the "right" side of the same UPC symbol. In other words, a decimal digit encoded on both the left side and the right side of a UPC symbol is encoded according to two different (mirror image) representations, within the one UPC bar code symbol.

The A-set and the C-set encodings are based on the widths of two bars and two spaces, which together encode a single decimal digit (i.e., the minimum amount of information that a single encoded symbol element can carry). The thinnest bar or space is considered to have a width of one unit. In each encoding, the total width of the bars and spaces for a given digit sums to 7 units. The A-set encoding (read from left to right) is given in table i, and the C-set encoding (also read from left to right) is given in Table II. Special codes are provided to identify the start, the end, and the middle of a UPC bar code. The start and end symbols are a bar, a space, and a bar, each one unit wide. The center or middle symbol is a sequence of three one unit width spaces separated by one unit width bars (i.e., "space-bar-space-bar-space").

TABLE I

A-Set Character Encoding

| Decimal Digit | Element Width Sequence (Space-Bar-Space-Bar) |
|---|---|
| 0 | 3-2-1-1 |
| 1 | 2-2-2-1 |
| 2 | 2-1-2-2 |
| 3 | 1-4-1-1 |
| 4 | 1-1-3-2 |
| 5 | 1-2-3-1 |
| 6 | 1-1-1-4 |
| 7 | 1-3-1-2 |
| 8 | 1-2-1-3 |
| 9 | 3-1-1-2 |

TABLE II

C-Set Character Encoding

| Decimal Digit | Element Width Sequence (Bar-Space-Bar-Space) |
|---|---|
| 0 | 3-2-1-1 |
| 1 | 2-2-2-1 |
| 2 | 2-1-2-2 |
| 3 | 1-4-1-1 |
| 4 | 1-1-3-2 |
| 5 | 1-2-3-1 |
| 6 | 1-1-1-4 |
| 7 | 1-3-1-2 |
| 8 | 1-2-1-3 |
| 9 | 3-1-1-2 |

Figure 4A:
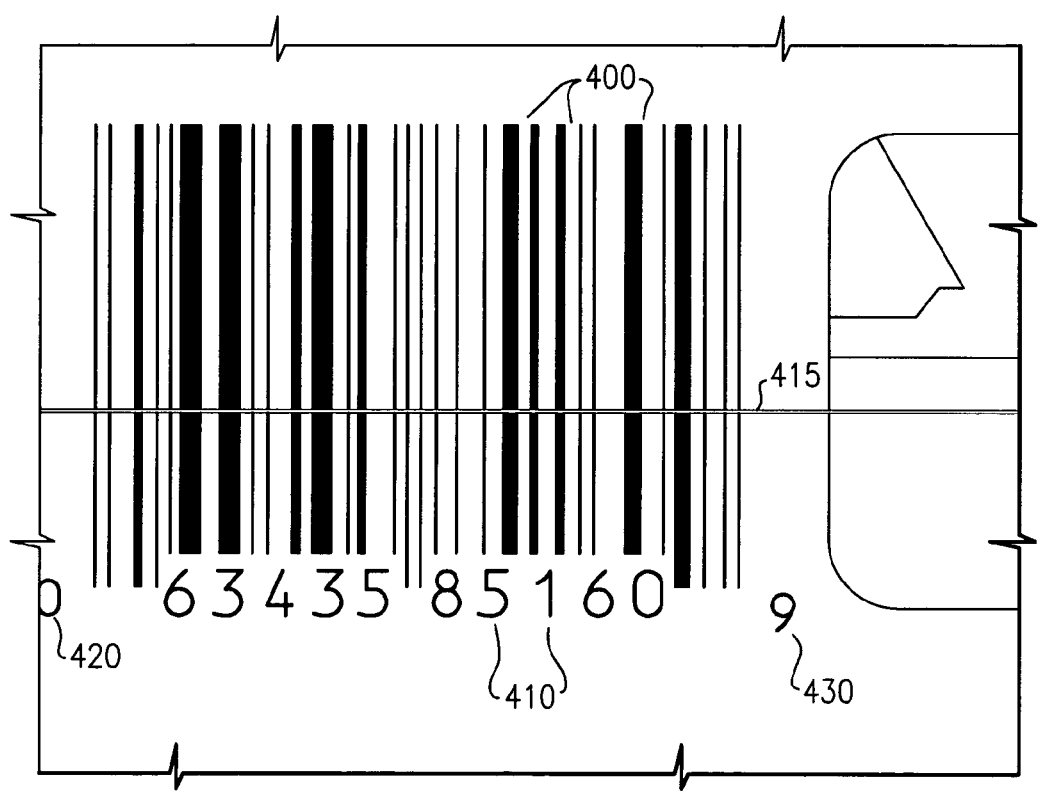
FIG. 4A is a close-up view of the UPC bar code of FIG. 4.

FIG. 4A is a close-up view of the UPC bar code of FIG. 4. By comparing the encodings for the digits "5" and/or "6", one can see the "mirror image" representation of the A-set character and the C-set character encodings. The bars and spaces 400, the decimal digits 410, and the scan line 415 passing from one side of the UPC bar code to the other are all shown in FIG. 4A. In FIG. 4A, the initial decimal "0" of the bar code is indicated by numeral 420 and the final decimal "9" of the bar code is indicated by the numeral 430.

In the examples that are given next, we have simulated one or more degradations in the UPC bar code of FIG. 4A. A UPC bar code that is deliberately degraded or defaced, for example by making a mark on the UPC bar code that extends from the "top" to the "bottom" of the bars and spaces, such as a mark that could be applied with a black marking pen, can render the UPC bar code "unreadable" with a conventional bar code reader. Other kinds of errors or degradations, such as printing errors, smeared bar code elements, bar code elements that are damaged, and bar codes that are out of focus (e.g., where the symbol to be read is physically situated at a location outside the focal range of the reader or out of pixel resolution limit), can create situations where a conventional bar code reader fails to decode one or more encoded symbol elements correctly. In particular, when the symbology is such that there is no error correction coding at an encoded symbol character level, there is no way in general to recover the correct value of the encoded symbol character from a flawed representation using conventional decoder technology. However, by using the current invention, it is possible in many cases to recover a value representative of a valid encoded symbol character of the symbology even when the valid encoded symbol character lacks error correction coding at the encoded symbol character level.

Consider the behavior of the element width sequence of the A-set character bar code given above when the encoded bar code elements are distorted over their entire length. It is most likely that bars and spaces having one unit width would be distorted, blurred, smeared, or damaged, as compared to bars and spaces having widths of 2, 3, or 4 units. In one embodiment, such a distortion can be the result of a diminution of contrast between a black bar and a white space, causing the transition between the two states to become difficult to distinguish. One set of resulting distorted sequences of bars and spaces is as shown in Table III.

TABLE III

| Decimal Digit | 4 element width sequence | 3 element width sequence (1-1->2 distortion) | 2 element width sequence (1-2->3 distortion) |
|---|---|---|---|
| 0 | 3-2-1-1 | 3-2-2 | |
| 1 | 2-2-2-1 | | |
| 2 | 2-1-2-2 | | |
| 3 | 1-4-1-1 | 1-4-2 | |
| 4 | 1-1-3-2 | 2-3-2 | |
| 5 | 1-2-3-1 | | |
| 6 | 1-1-1-4 | 2-1-4 | 3-4 |
| 6 | 1-1-1-4 | 1-2-4 | 3-4 |
| 7 | 1-3-1-2 | | |
| 8 | 1-2-1-3 | | |
| 9 | 3-1-1-2 | 3-2-2 | |

Figure 5A:
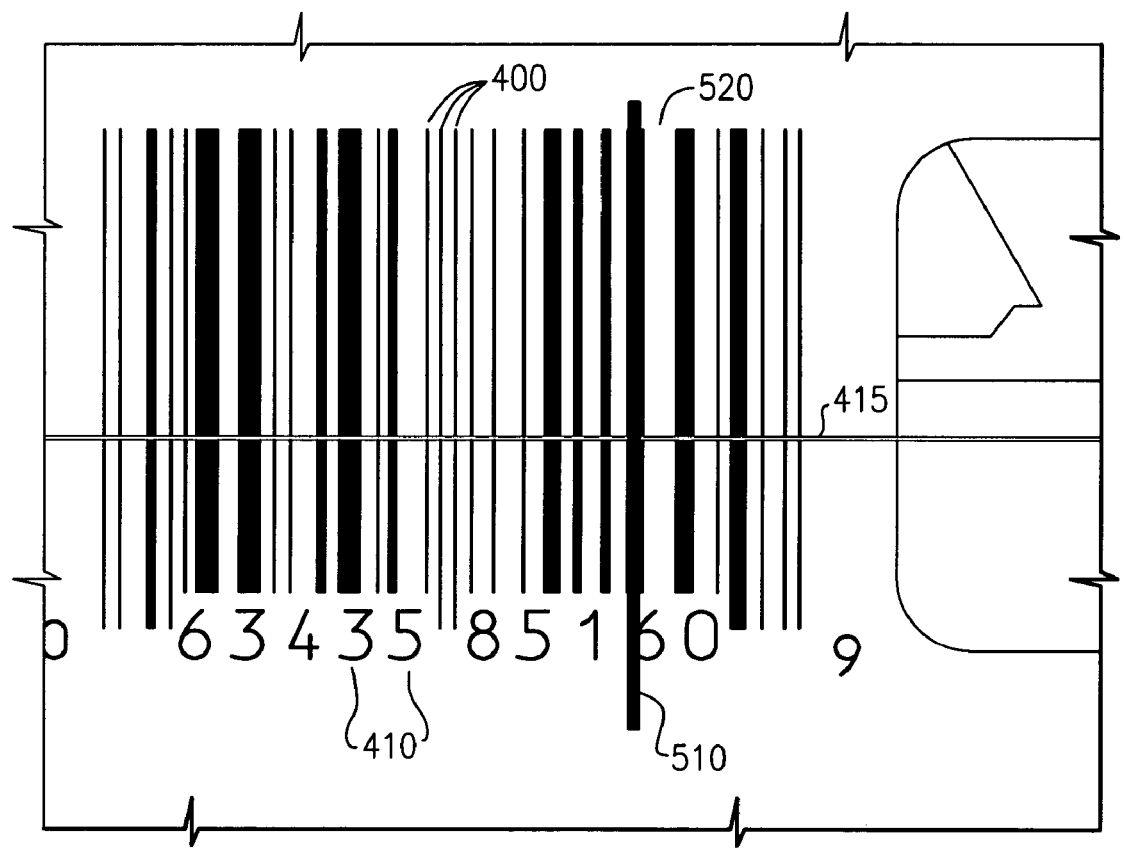
FIGS. 5A, 5B and 5C are illustrations of three deliberately modified UPC bar code examples, according to principles of the invention.
Figure 5B:
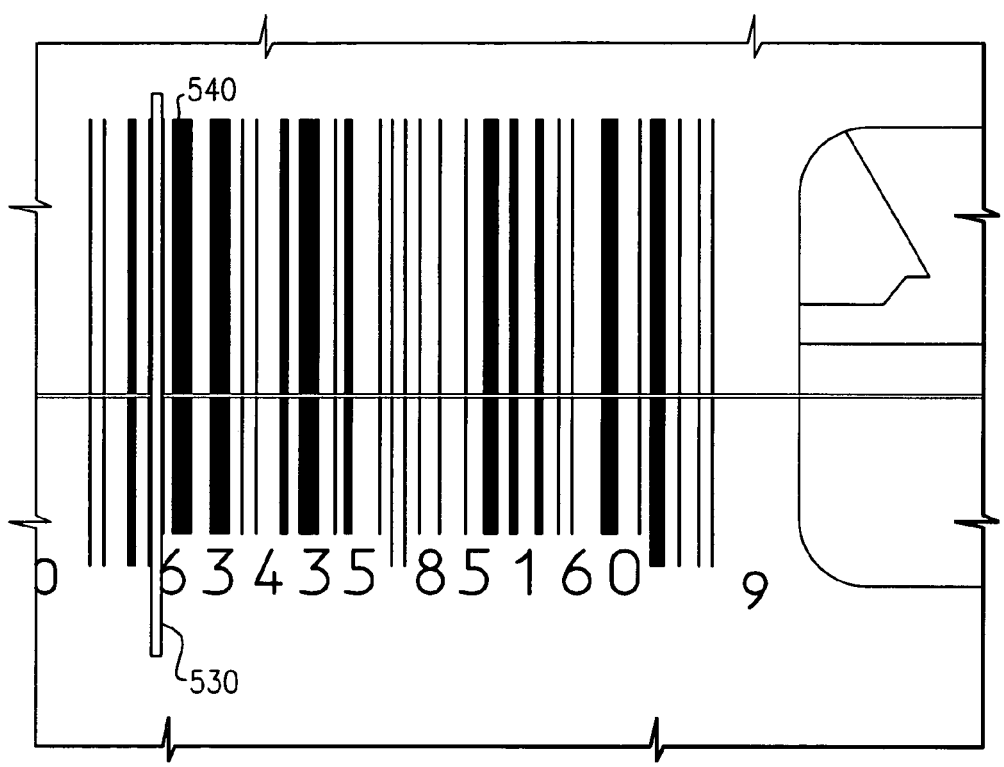
Figure 5C:
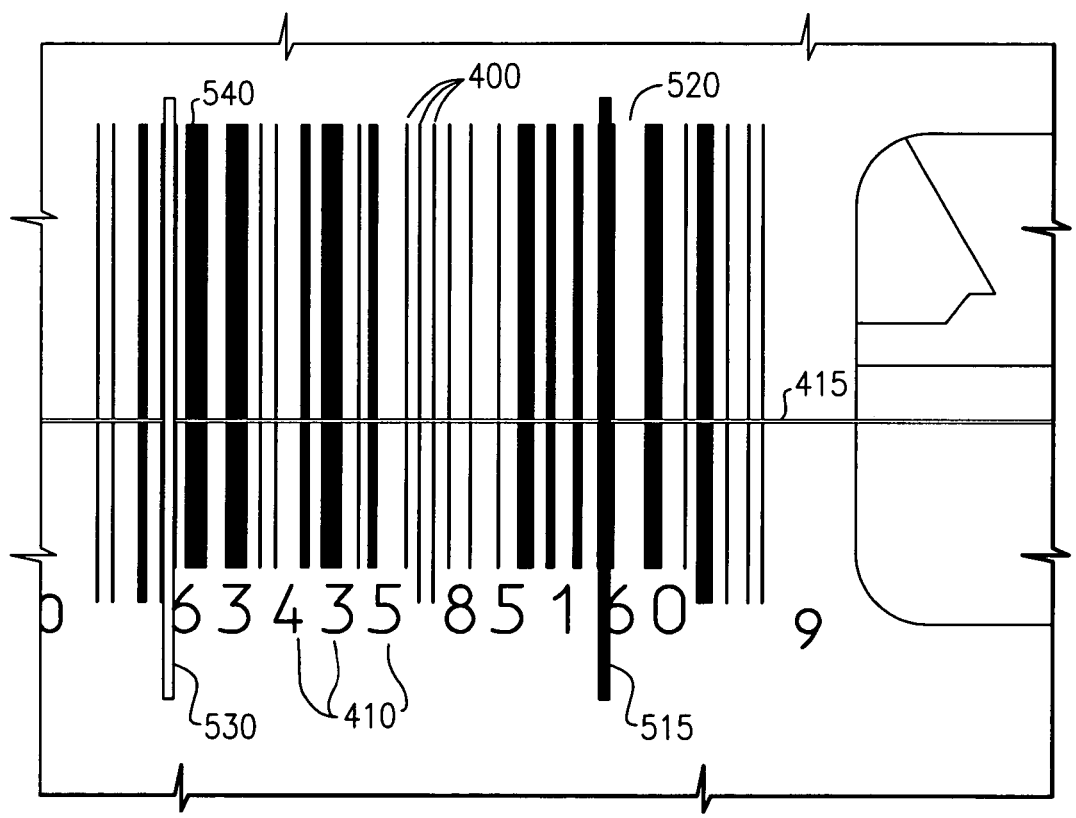

Turning to FIGS. 5A, 5B and 5C, there are shown three deliberately degraded UPC bar code examples. In FIG. 5A, the C-set representation of the digit 6 on the right hand side of the bar code has been deliberately damaged by the application of a 3 unit wide gray bar 510, which converts the bar-space-bar sequence at the beginning of the decimal digit 6 to a single gray bar, while preserving the wide space 520 of the original encoded symbol character. The original representation of the C-set digit 6 is an encoded symbol character having a sequence according to Table II that comprises a bar element of 1 unit in width, a space element of 1 unit in width, a bar element of 1 unit in width, and a space element of 4 units in width. In the deliberately damaged representation of the digit 6, there is a gray bar element of 3 units in width, and a space element of 4 units in width. This deliberately degraded representation is also a simulation of a valid representation read outside of pixel resolution limitation. The deliberately degraded representation fail to conform to any of the standard representations of a valid encoded C-set symbol character, both in that there are only two elements (one bar and one space) rather than 4 elements, and that there is no valid C-set encoded symbol character having both an element with 3 units of width and an element with 4 units of width, since the sum of all four elements must add up to 7. A conventional bar code reader (or more generally, a conventional imaging or reading device configured to read bar codes) fails to decode the deliberately degraded encoded symbol character. Furthermore, because there is no error correcting mechanism at the encoded symbol character level for the C-set symbology, there is no method by which the conventional bar code reader can decode the damaged or degraded encoded symbol character and provide a meaningful value for it. Nevertheless, by following the sequences of distortions as listed in Table 3, and applying principles of the invention, it is possible to identify the 3-4 sequence as having been derived from a valid sequence of an encoded symbol character corresponding to the decimal digit 6.

FIG. 5B is another example in which the A-set encoded symbol character corresponding to the decimal digit 6 on the left side of the UPC bar code has been deliberately modified or damaged. In the example of FIG. 5, a gray bar 530 has been applied over the region of the A-set character symbol corresponding to the sequence space-bar-space (each 1 unit in width), and leaving unmodified the black bar 540 having a width if 4 units. By the same process as described above for the C-set decimal digit 6 (which is the visually inverted representation of the A-set decimal digit 6, that is white spaces and black bars are exchanged when transforming from one representation to the other), a conventional bar code reader fails to decode the modified symbol, while a bar code reader operating according to the principles of the invention correctly decodes the modified, damaged or distorted encoded symbol character.

In FIG. 5C, both the C-set decimal digit 6 and the A-set decimal digit 6 encoded symbol characters have been deliberately modified as shown in FIGS. 5A and 5B, respectively, and as described hereinabove. A bar code reader operating according to principles of the invention can correctly decode the degraded encoded symbol characters and can report a valid value, corresponding to the original value of 6, that would have been read and decoded by a conventional bar code reader operating on the unmodified bar code of FIG. 4A. By comparison, conventional bar code readers fail to provide a valid value for such degraded encoded symbol characters.

FIG. 6 is a diagram that illustrates various signals, including actual recorded signals detected from a bar code, and signals obtained by subjecting the recorded signals to signal processing methods. In FIG. 6, the intensity of reflected illumination is given along the vertical axis (in arbitrary units). For reflective regions, such as white spaces, the reflectivity is relatively high, and the curve is correspondingly indicated as having a higher numerical value on the vertical axis. For black bars, which have lower reflectivity, the curve has a correspondingly lower numerical value on the vertical axis. In FIG. 6, the horizontal axis represents distance along the scan line 415 shown passing over any of the bar codes of FIGS. 4, 4A, 5A, 5B, and 5C. Alternatively, the horizontal axis can be considered to be a time axis.

In FIG. 6, the curve identified by the letter "A" is an actual signal recorded as the output signal of a detector that detects light intensity corresponding to illumination reflected from an encoded symbol character and that generates an electrical signal from the detected light intensity. In FIG. 6, the step function identified by the letter "B" is the signal derived from curve "A" by subjecting curve "A" to the action of an edge-crossing detection module. The edge-crossing detection module can be implemented in hardware (e.g., a hardware logic circuit or an edge detection circuit), or it can be implemented in software (e.g., a programmable processor programmed with a suitable set of instructions to identify when curve "A" crosses a threshold value).

In reading the sequence of fluctuations or changes of state in the actual data of curve "A," or in the step function "B" derived from curve "A," there are two mathematical sequences that can be defined. The first is the sequence of widths of the elements (the bars and spaces) that appear in the encoded symbol characters; this sequence is termed the "e-sequence" or "eseq" for convenience. An element width sequence ("eseq") can be derived from measuring the width of edge to edge transitions of the step function "B". For example, the step function "B" eseq is "3211111414111132141111231 . . . . " The second sequence that can be defined is called the "t-sequence" or "T-seq," which a sequence that defines a distance (or alternatively, for constant scan velocity, a time) for successive "cycles" of the state of a signal relative to zero; that is, a t-sequence value represents the sum of the widths of a space and an adjacent bar (either "space"-"bar" or "bar"-"space") such that the "t-sequence" corresponds to a return to an initial state after a zero crossing has occurred. For curve "A" and step function "B," the "t-sequence" is generated as 3+2, 2+1, 1+1, 1+1, 1+1, 1+1, 1+4, etc. Therefore, for curve "A" and step function "B," the "t-sequence is "53222255552224535522354" . . . .

FIG. 6 is presented with a series of vertical lines thereon, which vertical lines separate the curves shown in FIG. 6 into portions falling within sequential regions identified by the numerals 610, 612, . . . , 638, reading from left to right. Region 610 can be identified as containing the "start" signal (e.g., a bar of low reflectivity of one width unit, a space of higher reflectivity of 1 width unit and a second bar of low reflectivity of one width unit). The numerals "1 1 1" indicated immediately above curve "A" in region 610 indicate the relative widths of the symbol elements, and the "low"-"high-"low" sequence of curve "A" within region 610 is indicative of the relative reflectivities of the successive elements.

In FIG. 6, region 612 having a width sequence of 3-2-1-1 and a "high"-"low"-"high-"low" reflectivity sequence corresponds to the entry in Table I for the A-set encoding of the decimal digit "0" (symbol character 420 of FIG. 4).

In FIG. 6, region 614 has a width sequence of 1-1-1-4 and a "high"-"low"-"high-"low" reflectivity sequence. This corresponds to the entry in Table I for the A-set encoding for the decimal digit "6." Similarly, region 616 encodes A-set decimal digit "3," region 618 encodes A-set decimal digit "4," region 620 encodes A-set decimal digit "3," and region 622 encodes A-set decimal digit "5." Region 624 encodes the special symbol denoting the middle of the UPC bar code, e.g., "space-bar-space-bar-space", all having unit width.

In similar manner, one observes that regions 626, 628, 630, 632, 634, and 636 correspond, respectively, to encoded C-set decimal digits "8," "5," "1," "6," "0," and "9." The decimal digit 9 corresponds to the 9 indicated by the numeral 430 in FIG. 4A. Finally, region 638 corresponds to the special UPC character indicating the end of the UPC bar code, having a bar of 1 unit width, a space of 1 unit width, and a final bar of one unit width. Curve "A" and step function "B" represent an undistorted, unmodified, and undamaged UPC bar code, such as that of FIG. 4A, which is being read under proper conditions of illumination and within the focal range of the bar code reader.

Curve "C" of FIG. 6 is another example of an actual signal recorded as the output signal of the detector. Comparison of curve "C" with curve "A" shows that features of the actual signal are becoming degraded, which can result from one or more of loss of contrast, reaching the limit of the depth of field of the reader or imager, the bar code being out of focus, the bar code being smeared, the bar code being damaged, or lack of illumination. For example, the dynamic range of the "1-1-1" sequences of the "start" symbol, the "end" symbol, the middle character, and the "1-1-1" sequence encoding the decimal digit "6" all appear as oscillations having significantly smaller dynamic range than the corresponding sequences in curve "A." Nevertheless, by comparing curve "B" and step function "D," one sees that the edge-crossing module can still identify the appropriate crossing points and the bar code can still be read accurately.

In curve "E", further degradation due to one or more of reading a barcode outside of a pixel resolution limitation, a bar code that is hand motion smeared while capturing the image, and a bar code that is outside of limit of the depth of field of the image reader, the measured data has lost much of its detail, and sequences such as the "1-1-1" sequences of the "start" symbol, the "end" symbol, the middle character, and the "1-1-1-4" sequence encoding the decimal digit "6" all appear as large undifferentiated signals. As is seen from step function "F," the edge detector module is not able to identify a significant number of zero crossings, and the digitized step function "F" is not meaningful when viewed with a conventional bar code reader or imager.

In one embodiment, a decoding method that permits the decoding of such degraded signals is a maximum likelihood decoder (or "MLD"). One approach involves the use of least squares methods, whereby the raw data that are collected are subjected to least squares methods by comparison with the expected bar and space patterns of known UPC encoded symbol characters. As is well known, the sequence that results in the lowest residue, or least squares error, is considered to be the correct sequence.

In another embodiment, a distance called the Edge Shift Distance (or "ESD") is calculated, and the minimum ESD identifies the correct value of the encoded symbol character (or encoded symbol character sequence). As may be seen from curve "E" of FIG. 6, when sufficiently degraded signals are obtained, the distances (or e-sequence values) corresponding to the raw data may not be measured in distances of 1.0 units, but rather may be slightly different from purely unitary distances. For example, a sequence of raw data might be measured as 2.9 units, 2.1 units, 0.9 units and 1.2 units (e.g., R=2.9, 2.1, 0.9, 1.2). However, this sequence adds up to 7.1 total units, when a UPC bar code is defined as having a total width of 7.0 units. One can then normalize the R sequence, to generate normalized data having dimensions of 70/71=0.985915 times the raw dimensions, or 2.859, 2.070, 0.887, and 1.183. The "R-sequence" would then be r(1), r(1)+r(2), r(1)+r(2)+r(3), or 2.859, 4.929, 5.816, 6.999.

The ESD is determined by summing the absolute values of $r(i)-d_x(i)$, where $d_x(i)$ is the sum of the e-sequence values for a given digit X. For the present example, for decimal "0," $d_0(1)=3$, $d_0(2)=5$, $d_0(3)=6$, and $ESD_0=0.141+0.071+0.184=0.396$. For decimal "1," $d_1(1)=2$, $d_1(2)=4$, $d_1(3)=6$, and $ESD_1=0.859+0.989+0.184=2.033$. For decimal "2," $d_2(1)=2$, $d_2(2)=3$, $d_1(3)=5$, and $ESD_2=0.859+1.929+

$0.816=3.604$. For decimal "3," $d_3(1)=1$, $d_3(2)=5$, $d_3(3)=6$, and $ESD_3=1.859+0.071+0.184=2.114$. For decimal "4," $d_4(1)=1$, $d_4(2)=2$, $d_4(3)=5$, and $ESD_4=1.859+2.929+0.816=5.604$. For decimal "5," $d_5(1)=1$, $d_5(2)=3$, $d_5(3)=6$, and $ESD_5=1.859+1.929+0.184=3.972$. For decimal "6," $d_6(1)=1$, $d_6(2)=2$, $d_6(3)=3$, and $ESD_6=1.859+2.929+2.816=7.606$. For decimal "7," $d_7(1)=1$, $d_7(2)=4$, $d_7(3)=5$, and $ESD_7=0.141+0.929+0.816=3.604$. For decimal "8," $d_8(1)=1$, $d_8(2)=3$, $d_8(3)=4$, and $ESD_8=1.859+1.929+1.816=5.604$. For decimal "9," $d_9(1)=3$, $d_9(2)=4$, $d_9(3)=5$, and $ESD_9=0.859+0.929+0.816=2.604$. Decimal "0" appears to be the digit with the lowest edge shift distance, or 0.396 units. One can define the measurement with greater or less precision, depending on how finely one can measure the raw data.

In another embodiment, the method for deducing the correct value deals with the apparent width of an encoded symbol character as compared to the known width of an encoded symbol character. For UPC bar codes, as already indicated, the known width of each encoded symbol character is 7 units. Suppose that a reader observes a sequence that appears to be "3-2-2-3" which does not conform to any known UPC bar code sequence. The decoding process can consider this pattern to possibly represent one of a 2-element pattern (with excess data), a 3-element pattern (with excess data), or a 4-element pattern. First, one normalizes the pattern pf interest to a 7 unit wide pattern. For the possible 2-element pattern, the sequence "3-2" has a width of 5 units, and would be normalized to a pattern of 4.2-2.8. The only 2-element pattern that we have defined is "3-4" (corresponding to decimal digit "6"), for which an ESD of $1.2+1.2=2.4$ is deduced. For the 3-element sequence, we have "3-2-2" with a width of 7 units. This sequence does not need to be normalized, but it corresponds to either decimal digit "0" or decimal digit "9". For the 4-element sequence "3-2-2-3" the total width is 10, and normalizing by multiplying by 0.7 yields the sequence "2.1-1.4-1.4-2.1." The ESD for decimal digit "2" is $0.1+0.4+0.6+0.1=1.2$. The ESD for decimal digit "1" is $0.1+0.6+0.6+1.1=2.4$. The ESD for decimal digit "9" is $0.9+0.4+0.4+0.1=1.8$. The ESD for decimal digit "0" is $0.9+0.6+0.4+1.1=3.0$.

We can distinguish between the decimal "0" and decimal "9" results for the 3-element case by using real values in the lookup table. For example, for decimal "0" we may use values of "3-2-$\epsilon$-2-$\epsilon$" where $\epsilon$ is a small number greater than zero, and we can use values of "3-2-$\epsilon$-2+$\epsilon$" for decimal "9." Alternatively, we can use gray scale values on a nonlinear curve (i.e., values which are not strictly in fixed integer proportion to each other) in order to distinguish modified values of bar code elements.

In other embodiments, one could equally well use a multidimensional bar code, for example the well known PDF417 stacked bar code symbology, or the 2-D Aztec symbology. The PDF417 symbology is defined with regard to two states, as discussed above. The PDF417 symbology is discussed as follows at the website http://www.pdf417.com/glossary.htm:

An error correcting two-dimensional multi-row symbol developed in 1992 . . . ,

PDF417 symbols are constructed from 4 bars and 4 spaces over 17 modules. The symbol size is from 3 to 90 rows. There is no specified minimum or maximum for X or Y dimension. With at least the recommended minimum level of error correction, the recommended Y dimension is 3X. With less than the minimum recommended level of error correction, the recommended Y dimension is 4X. A quiet zone of 2X is specified on each side of a symbol. Because of delta decode techniques the symbology is immune from uniform bar width growth. PDF417 supports cross-row scanning. The intellectual property rights associated with PDF417 have been committed to the public domain. For more information go to the AIM, USA web site.

While the invention can be practiced using images having two states (e.g., black bars and white spaces on a white background), it is also applicable to images having more than two states, such as color images or gray scale images. A Synthesis Decoder may be constructed to go beyond the limitation created by the inability to decode images at sub-pixel resolution. In addition a Synthesis Decoder can be designed to handle the element width error caused by convolution distortion. A Synthesis Decoder synthesizes the expected "degraded" codeword waveform using the knowledge of system PSF to construct a Synthesis Decode Table, instead of attempting to recover the bar and space sequence from a degraded image. According to Logan's Theorem, the pre-constructed "degraded" codeword waveform can be reduced to a set of edge positions without incurring any loss of information. Therefore, in one embodiment, a Synthesis Decode Table entry contains a sequence of edge positions, or equivalently a sequence of element widths (i.e., a T-sequence). Then, in one embodiment, the Synthesis Decoder behaves in a manner similar to a conventional decoder, by performing a lookup operation in the Synthesis Decode table to decode a "degraded" codeword corresponding to an original, undegraded barcode, which is then unambiguously identified.

Synthesis Decode Table

In one embodiment, the Synthesis Decode Table can be constructed using a UPC symbology.

Figure 7:
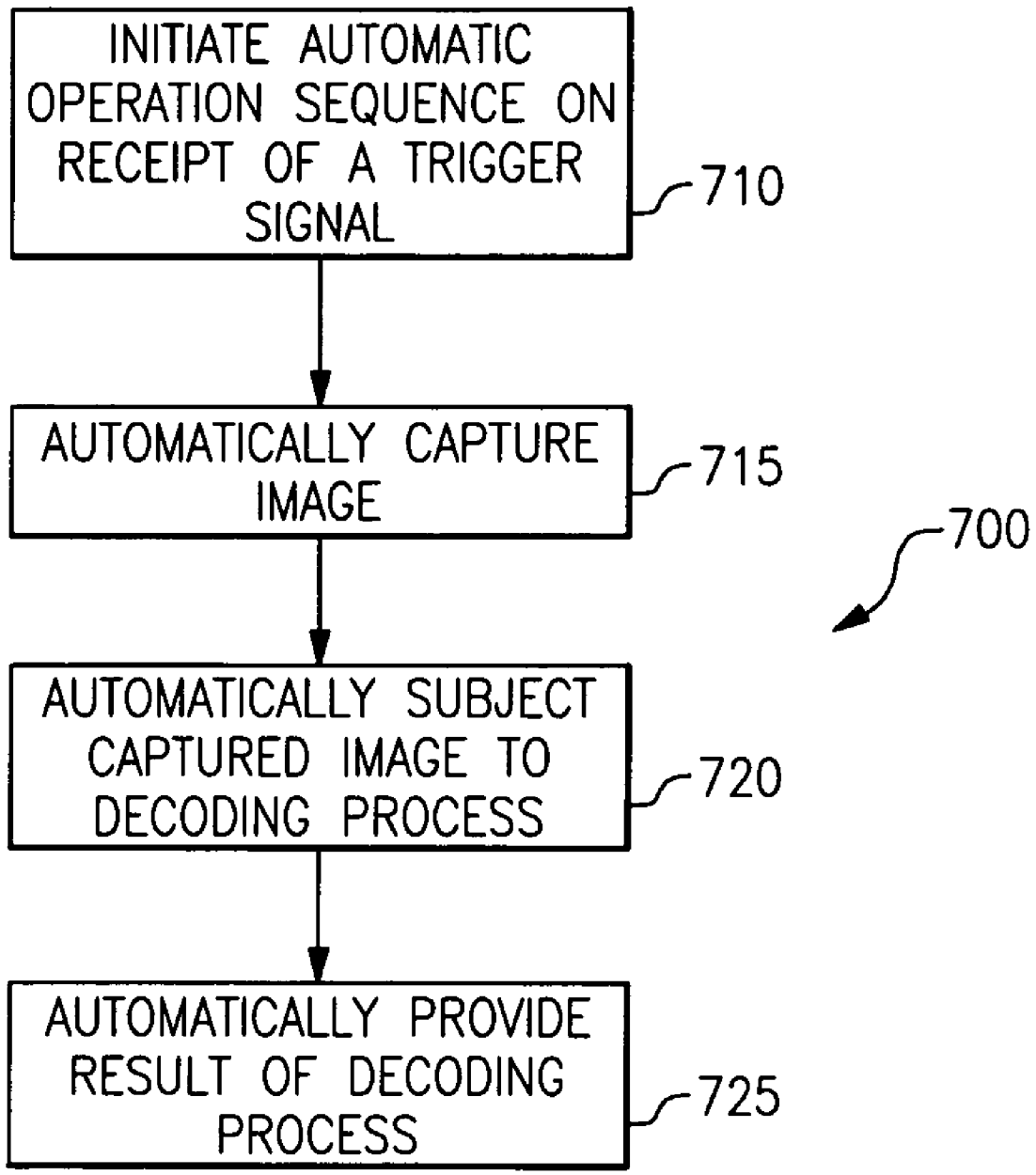
FIG. 7 is a schematic flow chart showing steps of the automatic operation of a handheld reader in response to an activation of a trigger mechanism, according to principles of the invention.

FIG. 7 is a schematic flow chart 700 showing steps of the automatic operation of a handheld reader in response to an activation of a trigger mechanism, according to principles of the invention. The trigger mechanism can be any of the activation of a manual trigger mechanism operated by a user, for example by manual depression of a button; a detector that senses the presence of an object of interest within a field of view of the reader; and receiver that receives a command from a spaced apart device, for example from a controller situated outside the handheld, or portable, reader.

As shown in FIG. 7, step 710 is the initiation of an automatic operation sequence on receipt of a trigger signal. Step 715 is the automatic capturing of an image in response to the receipt of the trigger signal. Step 720 is the automatic application of the decoding process using a synthesis decoder to the captured image. Step 725 is the automatic provision of a result of the decoding process, such as displaying a result to a user, or providing a result to a data processing system, such as a data processing system used in retail sales, such as is found in a supermarket environment. The step 725 can also be understood as providing a result to a third party, such as a customer of a retail establishment. In describing the process steps as taking place automatically, it is to be understood that once a suitable trigger signal is received by the trigger mechanism, the remainder of the process occurs under the control of an automatic device, such as a programmed computer, which does not require the further intervention of a user of the system before a result is obtained. A result can be a successful decoding of a bar code according to principles described hereinabove, it can be a message indicating that the bar code is not interpretable, or it can be any message intended to convey information to a user or to the data processing system.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope and spirit of the following claims.

What is claimed is:

1. A bar code reading apparatus for decoding a degraded encoded symbol character of a symbology, comprising:
   a detector that detects light intensity corresponding to illumination reflected from the degraded encoded symbol character and that generates an electrical signal from the detected light intensity, the degraded encoded symbol character failing to conform with a standard definition of a character of said symbology;
   a signal processor that recovers from the generated electrical signal a value representative of a valid encoded symbol character of the symbology; and
   a Synthesis Decode Table having values representative of valid encoded symbol characters correlated to bar space patterns having a number of bar space elements that deviate from a standard defined number of bar space elements for said symbology.

2. The bar code reading apparatus for decoding a degraded encoded symbol character of claim 1, wherein the signal processor comprises a microprocessor, a memory, and instructions recorded on a machine-readable medium for controlling operation of the microprocessor.

3. The bar code reading apparatus for decoding a degraded encoded symbol character of claim 1, wherein the valid encoded symbol character corresponds to a value represented by the degraded encoded symbol character at a time prior to it being degraded.

4. The bar code reading apparatus for decoding a degraded encoded symbol character of claim 1, wherein the detector comprises an imager device having a plurality of pixel elements.

5. The bar code reading apparatus for decoding a degraded encoded symbol character of claim 1, wherein the detector comprises a laser scanner apparatus.

6. The bar code reading apparatus for decoding a degraded encoded symbol character of claim 1, wherein the bar code reading apparatus is of a format compact enough to be operated while being supported by a hand of a user.

7. The bar code reading apparatus for decoding a degraded encoded symbol character of claim 1, wherein the symbology is a Universal Product Code ("UPC") symbology.

8. The bar code reading apparatus for decoding a degraded encoded symbol character of claim 1, wherein the signal processor compares the generated electrical signal to a predefined signal.

9. The bar code reading apparatus for decoding a degraded encoded symbol character of claim 1, further comprising an analog-to-digital converter for digitizing the generated electrical signal.

10. A bar code reading apparatus for processing a degraded encoded symbol character of a symbol in accordance with a symbology lacking error correction at a symbol character level and wherein according to a standard definition of the symbology M element bar space patterns are correlated to valid symbol characters, and wherein said degraded encoded symbol character is degraded such that said degraded encoded symbol character has M-N bar space elements, said apparatus comprising:
   detector that detects light intensity corresponding to illumination reflected from said degraded encoded symbol character and that generates an electrical signal from said detected light intensity;
   pre-stored information correlating M-N element bar space patterns with valid symbol characters of said symbology having a symbology standard definition wherein M element bar space patterns are correlated to said valid symbol characters; and
   a signal processor utilizing said pre-stored information to recover from said generated electrical signal a value representative of a valid encoded symbol character of said symbology.

11. The bar code reading apparatus of claim 10, wherein said pre-stored information includes calculated values calculated to be produced by said detector when a valid encoded symbol character is disposed a distance selected from one of distance shorter than a minimum working distance of said bar code reading apparatus or a distance longer than a maximum working distance of said bar code reading apparatus.

12. The bar code reading apparatus of claim 10, wherein said pre-stored information is determined by reading known indicia at known distances and recoding produced signals.

13. The bar code reading apparatus of claim 10, wherein said pre-stored information is determined by synthesizing expected decoded waveform utilizing a point spread function of said bar code reading apparatus.

14. The bar code reading apparatus of claim 10, wherein said signal processor in recovering said value from said electrical signal determines an edge shift distance for said electrical signal.

15. The bar code reading apparatus of claim 10, wherein said signal processor in recovering said value from said electrical signal does not attempt to recover missing bar space elements from said electrical signal.

16. The bar code reading apparatus of claim 10, wherein said bar code reading apparatus is hand held.

17. The bar code reading apparatus of claim 10, wherein said detector is a multiple pixel image sensor.

18. The bar code reading apparatus of claim 10, wherein said certain symbology is UPC symbology.

19. The bar code reading apparatus of claim 10, wherein said degraded encoded symbol character has a 3 unit wide black bar in place of a bar-space-bar pattern converting said bar-space-bar pattern into a 3 unit wide bar.

20. A bar code reading apparatus for processing a degraded encoded symbol character of a symbol in accordance with a symbology and wherein according to a standard definition of said symbology M element bar space patterns are correlated to valid symbol characters, and wherein said degraded encoded symbol character is degraded such that said degraded encoded symbol character has K bar space elements, and wherein K is not equal to M, said apparatus comprising:
a detector that detects light intensity corresponding to illumination reflected from said degraded encoded symbol character and that generates an electrical signal from said detected light intensity;
pre-stored information correlating a K element bar space pattern with a valid symbol character of said symbology having a symbology standard definition wherein M element bar space patterns are correlated to said valid symbol characters; and
wherein said barcode reading apparatus utilizes said pre-stored information to recover from said generated electrical signal a value representative of a valid encoded symbol character of said symbology.

21. The bar code reading apparatus of claim 20, wherein said pre-stored information includes calculated values calculated to be produced by said detector when a valid encoded symbol character is disposed a distance selected from one of distance shorter than a minimum working distance of said bar code reading apparatus or a distance longer than a maximum working distance of said bar code reading apparatus.

22. The bar code reading apparatus of claim 20, wherein said pre-stored information is determined by reading known indicia at known distances and recoding produced signals.

23. The bar code reading apparatus of claim 20, wherein said pre-stored information is determined by synthesizing expected decoded waveform utilizing a point spread function of said bar code reading apparatus.

24. The bar code reading apparatus of claim 20, wherein said bar code reading apparatus in recovering said value from said electrical signal determines an edge shift distance for said electrical signal.

25. The bar code reading apparatus of claim 20, wherein said bar code reading apparatus in recovering said value from said electrical signal does not attempt to recover missing bar space elements from said electrical signal.

26. The bar code reading apparatus of claim 20, wherein said bar code reading apparatus is hand held.

27. The bar code reading apparatus of claim 20, wherein said detector is a multiple pixel image sensor.

28. The bar code reading apparatus of claim 20, wherein said certain symbology is UPC symbology.

29. The bar code reading apparatus of claim 20, wherein said degraded encoded symbol character has a 3 unit wide black bar in place of a bar-space-bar pattern converting said bar-space-bar pattern into a 3 unit wide bar.

* * * * *